United States Patent
LaFramboise

[15] 3,684,999
[45] Aug. 15, 1972

[54] CONDUCTIVE FLEXIBLE COUPLING

[72] Inventor: Leo F. LaFramboise, Saginaw, Mich.

[73] Assignee: General Motors Corporation, Detroit, Mich.

[22] Filed: Nov. 9, 1970

[21] Appl. No.: 87,773

[52] U.S. Cl. .................................... 339/3, 64/13
[51] Int. Cl. ........................................ H01r 5/06
[58] Field of Search ......... 91/380; 64/10, 13; 180/78; 339/3, 96, 7

[56] References Cited

UNITED STATES PATENTS

| 1,376,107 | 4/1921 | MacDonald | 64/13 |
| 1,067,024 | 7/1913 | Hall et al. | 339/96 X |
| 2,753,848 | 7/1956 | Burton | 91/380 |
| 3,115,759 | 12/1963 | Crane | 64/10 X |
| 3,360,963 | 1/1968 | Turunen | 64/13 |
| 3,386,069 | 5/1968 | Eriksson | 339/7 |

*Primary Examiner*—Richard E. Moore
*Attorney*—Jean L. Carpenter and Arthur N. Krein

[57] ABSTRACT

A conductive flexible coupling for coupling together two rotatable shafts in which a flexible member disposed between and connected to a conductive flange carried by one shaft and to a conductive flange carried by the other shaft is provided on at least one side thereof with a flexible screen for providing an electrical path between the two conductive flanges.

3 Claims, 4 Drawing Figures

INVENTOR.
Leo F. LaFramboise
BY
Arthur N. Krein
ATTORNEY

CONDUCTIVE FLEXIBLE COUPLING

This invention relates to steering apparatus for use in automotive vehicles and the like and, in particular, to a bipartite steering shaft in which the two shaft sections are interconnected by a conductive flexible coupling to provide a continuous electrically conductive path through the steering shaft arrangement for an electrical operated horn or the like.

Flexible couplings of the type, for example, as disclosed in U.S. Pat. No. 2,753,848 issued on July 10, 1956, to Robert W. Burton, have been used for a number of years to couple together the shaft sections of a steering shaft of an automotive vehicle. In this type of coupling, the flexible element is normally made of rubber, canvas and rubber discs bonded together, or other similar materials which are electrically nonconductive. With the use of such a prior art coupling in the steering shaft column, there is a break at the coupling in the conductive electrical path through the steering shaft column and, accordingly, when elements, such as a horn button, were provided in the steering column, an additional electrical conductive circuit in the form of a wire had to be employed to effect grounding of the horn relay when the horn button was depressed.

It is therefore the primary object of this invention to provide a flexible coupling for use on a bipartite steering shaft whereby a conductive screen is provided on the flexible member of the flexible coupling for providing an electrical path between the two shaft elements being coupled together.

Another object of this invention is to improve a flexible disc for use in a flexible coupling whereby one surface of the flexible disc is provided with a flexible conductive wire grid adapted to provide electrical contact between mating parts of the flexible coupling.

These and other objects of the invention are attained by means of a conductive flexible coupling comprising a flexible member having a conductive screen bonded on one side thereof with the wires of the screen exposed at the surface of the flexible element, the flexible member being disposed between the flange carried by an upper steering shaft section and the flange carried by a lower steering shaft section, the lower flange section being connected to the flexible member with the rivet connectors extending axially for engagement in slotted portions of the flange element on the upper steering shaft member and, a pair of connectors in the form of bolts are used to secure the flange of the upper shaft section to the flexible member.

For a better understanding of the invention, as well as other objects and further features thereof, reference is had to the following detailed description of the invention to be read in connection with the accompanying drawings, wherein.

Figures 1, 2, 3, 4:
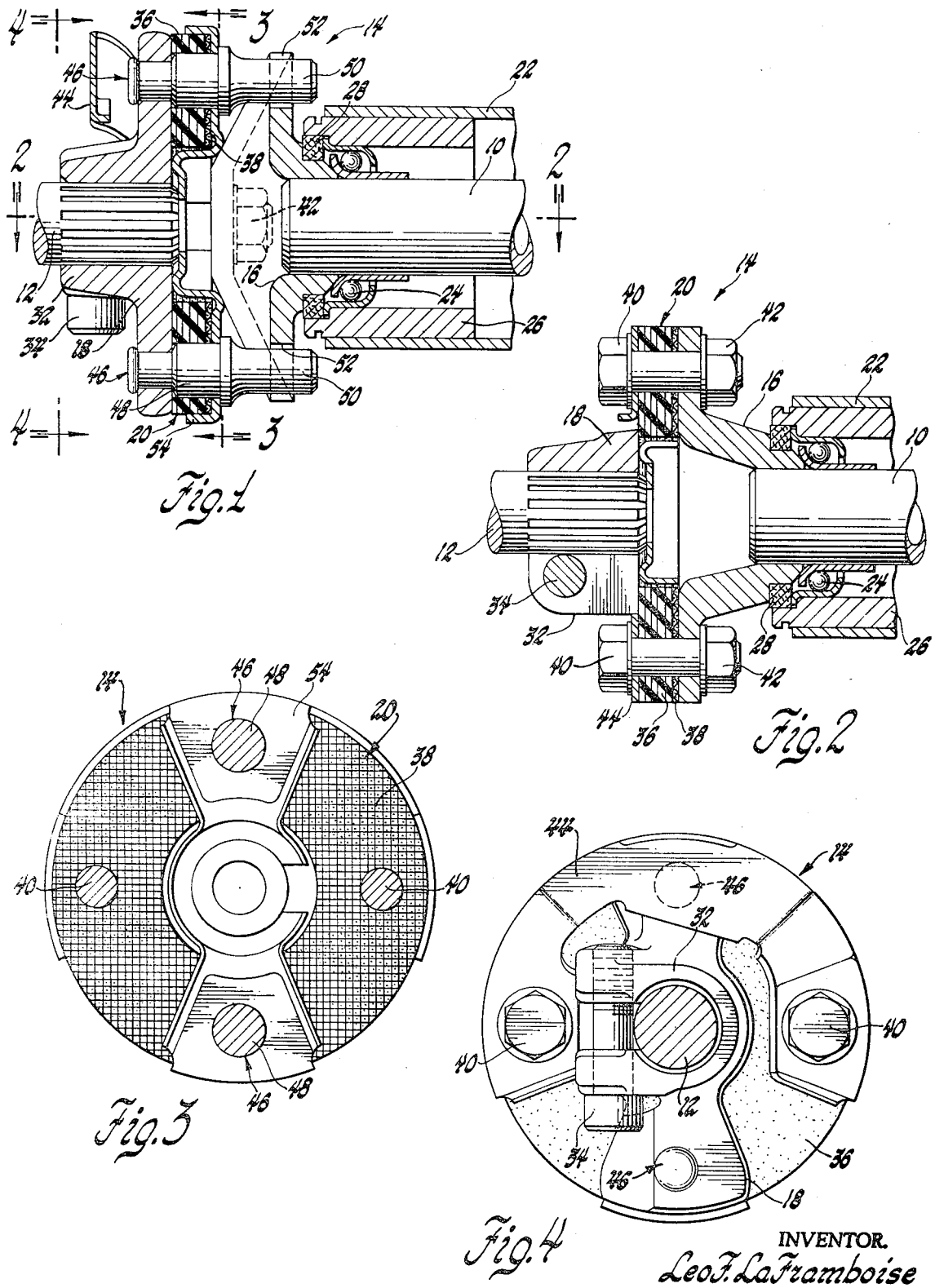
FIG. 1 is a longitudinal sectional view of the conductive flexible coupling of the invention used to connect the lower and upper shaft sections of a steering column together.
FIG. 2 is a sectional view taken at right angles to the sectional view of FIG. 1.
FIG. 3 is a view taken along line 3—3 of FIG. 1.
FIG. 4 is a view taken along line 4—4 of FIG. 1.

Referring now to FIGS. 1 and 2, the upper steering shaft section 10 of the steering column of an automotive vehicle is coupled to the lower shaft section 12 by a flexible coupling, generally designated 14, constructed in accordance with the invention. The flexible coupling 14 includes a pair of flanges 16 and 18 with a flexible disc 20 therebetween.

The upper steering shaft section 10 which is enclosed by a steering column or mast jacket 22 and held against axial movement therein by means, not shown, is provided at one end with a steering wheel, not shown, and at its opposite end is secured, as by welding or in any other suitable manner, to the upper flange 16 of the coupling. The upper steering shaft section 10 is journaled at this end by means of a bearing 24 positioned in the bearing support ring 26 secured within the lower end of the steering column 22. A sealing ring 28 is interposed between the flange 16 and the bearing support ring 26.

The lower shaft section 12 is spline connected at its upper end to the split hub portion 32 on the lower flange 18, the split hub portion 32 being clamped securely to the shaft section 12 by means of bolt 34.

Flexible coupling 20, in accordance with the invention, includes a main flexible body portion 36 faced at one end thereof with an exposed flexible conductive wire grid 38. Body portion 36 made of rubber or similar material can be made as a single disc or, as shown, as a stack of rubberized or elastomerized fabric or paper discs suitably bonded together. The flexible conductive wire grid 38 is conveniently in the form of a metal wire screen, as for example, a 12 × 12 mesh to 24 × 24 mesh steel wire screen with the wire screen set in the material of the body portion 36 but with the metal exposed on the outer surface of the composite flexible disc 20.

The upper flange 16 is substantially circular in configuration while lower flange 18 is generally bar-like in form, as seen in FIG. 4. Upper flange 16 is secured by suitable connectors, as by a pair of bolts 40 and nuts 42, directly to the flexible disc 20 with a semi-circular reinforcement strap 44 positioned on the opposite side of the flexible disc 20 from the upper flange 16, whereby through these bolt and nut connectors, the upper flange 16 is held in direct electrical contact with the wire grid 38 in the two areas as seen in FIG. 2.

Lower flange 18 is secured by a second pair of connectors, in the form of rivets 46, to the flexible disc 20. As shown in FIG. 1, each rivet 46 has a stepped shank portion 48 extending through a reinforcement plate 54, the flexible disc 20 and the lower flange 18 with the portion of the stepped shank portion 48 of largest diameter being substantially coextensive with the thickness of the flexible disc 20. In addition, each rivet 46 is provided with an extension 50 received in a slot 52 formed in the upper flange 16. Thus, each rivet 46 fixed to the flange 18 is also in electrical contact with the wire grid 38 through the contact of its shoulder against the reinforcement plate 54.

The reinforcement strap 44 and reinforcement plate 54 are used to distribute the pressure of the connectors, bolts 40 and rivets 46, over substantial areas on the faces of the flexible disc 20. Reinforcement plate 54 is made of metal or other conductive material to provide the electrical contact between the wire grid 38 and the rivets 46.

With this arrangement, it is obvious that although the bolts 40 serve only to secure the upper flange 16 to the flexible disc 20, the rivets 46 in addition to securing the lower flange 18 to the flexible disc 20 also provide, through the extensions 50 thereof, a direct rotary driving connection between the lower flange 18 and the upper flange 16 by engagement of these extensions into the slots 52 provided for this purpose in the upper flange 16.

In addition with this arrangement, the upper and lower shafts are provided with electrical conductive paths therebetween since the wire grid 38 electrically interconnects through the bolts and rivets the upper and lower flanges together.

What is claimed is:

1. A conductive flexible coupling for connecting together a first shaft and a second shaft comprising a first flange adapted to be secured to said first shaft, a second flange adapted to be secured to said second shaft, a flexible disc, first connector means connecting said flexible disc to said first flange, and second connector means connecting said flexible disc to said second flange, said second connector means being positioned to be in driving connection with said first flange, said flexible disc including a main flexible body portion and a flexible wire grid screen of conductive material set in said body portion with said wire grid screen exposed on one side for electrically connecting said first flange and said second flange, through said first connector means and said second connector means, together.

2. In a steering apparatus including a steering shaft having an upper shaft section and a lower shaft section joined together by a flexible coupling, said coupling comprising a first flange secured to said upper shaft section, a second flange secured to said lower shaft section, a flexible disc having a conductive wire grid screen secured thereon, first connector means connecting said flexible disc to said first flange with said wire grid screen in electrical contact therewith, and second connector means connecting said flexible disc to said second flange with said second connector means in electrical contact with said wire grid screen, said second connector being positioned to be in driving connection with said first flange.

3. In a steering apparatus including a steering section having an upper shaft section and a lower shaft section joined together by a flexible coupling, said flexible coupling comprising a first flange secured to said upper shaft section, a second flange secured to said lower shaft section, a flexible member disposed between said first flange and said second flange, a first pair of connectors connecting said flexible member to said first flange, a second pair of connectors connecting said flexible member to said second flange, said second pair of connectors extending into driving engagement with said first flange, said flexible member including a flexible body portion with a flexible wire grid screen of conductive material secured at least on one surface thereof and positioned in electrical contact with said first flange and being connected electrically through said second pair of connectors to said second flange.

* * * * *